United States Patent
Sun et al.

(10) Patent No.: US 6,741,581 B1
(45) Date of Patent: May 25, 2004

(54) SYSTEM AND METHOD FOR TRANSMITTING DATA IN FRAME FORMAT USING AN R-RAKE RETRANSMISSION TECHNIQUE WITH BLIND IDENTIFICATION OF DATA FRAMES

(75) Inventors: Feng-Wen Sun, Germantown, MD (US); Lin-Nan Lee, Potomac, MD (US); Khalid Karimullah, Olney, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/399,839

(22) Filed: Sep. 21, 1999

Related U.S. Application Data

(60) Provisional application No. 60/101,269, filed on Sep. 22, 1998.

(51) Int. Cl.[7] .................................................. H04L 1/16
(52) U.S. Cl. ........................................ 370/338; 370/412
(58) Field of Search ................................. 370/235, 228, 370/349, 232, 252, 389, 391, 394, 399, 422, 467, 216, 320, 392, 477, 242, 256; 714/751, 755, 786, 795, 794

(56) References Cited

U.S. PATENT DOCUMENTS

| | | | | |
|---|---|---|---|---|
| 4,989,202 A | * | 1/1991 | Soto et al. .................. 370/244 |
| 5,165,091 A | * | 11/1992 | Lape et al. .................. 370/216 |
| 5,235,618 A | * | 8/1993 | Sakai et al. .................. 375/253 |
| 5,406,613 A | * | 4/1995 | Peponides et al. .......... 370/311 |
| 5,408,475 A | * | 4/1995 | Lee .............................. 714/715 |
| 5,432,775 A | * | 7/1995 | Crayford ..................... 370/248 |
| 5,715,257 A | * | 2/1998 | Matsuki et al. ............. 714/748 |
| 5,721,733 A | * | 2/1998 | Wang et al. ................. 370/332 |
| 5,903,550 A | * | 5/1999 | Spock ......................... 370/335 |
| 5,950,131 A | * | 9/1999 | Vilmur ........................ 455/434 |
| 6,011,796 A | * | 1/2000 | Rezaiifar et al. ........... 370/394 |
| 6,101,168 A | * | 8/2000 | Chen et al. ................. 370/228 |
| 6,118,765 A | * | 9/2000 | Phillips ....................... 370/235 |
| 6,138,260 A | * | 10/2000 | Ketseoglou ................. 714/751 |
| 6,141,352 A | * | 10/2000 | Gandy ......................... 370/463 |
| 6,185,199 B1 | * | 2/2001 | Zehavi ....................... 370/335 |
| 6,282,250 B1 | * | 8/2001 | Lundby ....................... 375/340 |
| 6,359,877 B1 | * | 3/2002 | Rathonyi et al. ........... 370/232 |

* cited by examiner

*Primary Examiner*—Huy D. Vu
*Assistant Examiner*—Daniel Ryman
(74) *Attorney, Agent, or Firm*—John T. Whelan

(57) ABSTRACT

A system and method for retransmitting data frames, which were inadequately received by a receiver, back to the receiver to increase receiver gain. Upon receiving a retransmission request from the receiver, the data transmitter retransmits a particular data frame to the receiver without transmitting a signaling message, and the receiver compares it to other data frames stored in a buffer. When a match is believed to exist, the receiver combines the retransmitted data frame with the matching data frame. Based on the result of a cyclic redundant code (CRC) check performed on the combined data frame, the receiver either provides the combined data frame to a higher layer in the receiver, or stores either the combined data frame, or the retransmitted and potentially matching data frame, in the buffer, depending on a confidence in the potential match, and sends another retransmission request to the transmitter to again retransmit the data frame and the above process is repeated.

26 Claims, 2 Drawing Sheets

SYSTEM AND METHOD FOR TRANSMITTING DATA IN FRAME FORMAT USING AN R-RAKE RETRANSMISSION TECHNIQUE WITH BLIND IDENTIFICATION OF DATA FRAMES

This application claims the benefit under 35 U.S.C. § 119(e) of a U.S. provisional application of Feng-Wen Sun, Lin-Nan Lee and Khalid Karimullah entitled "R-Rake with Blind Identification of Packets", Ser. No. 60/101,269, filed on Sep. 22, 1998, the entire contents of which is incorporated by reference herein.

BACKGROUND OF THE INVENTION

1. Field of the Invention

The present invention relates to a system and method for effectively and efficiently retransmitting data frames, which were inadequately received by a receiver, back to the receiver for combination with the inadequately received data frames to increase gain at the receiver. More particularly, the present invention relates to a system and method for transmitting data in data frame format using an R-Rake retransmission technique which employs a blind identification scheme for identifying the retransmitted data frames to be combined with previously transmitted data frames at a receiver, thus eliminating the need to transmit a signaling message to the receiver for identifying the data frames to be combined.

2. Description of the Related Art

Wireless communication systems, such as satellite-based or terrestrial-based communications systems, as well as wire-line communications systems, such as public switched telephone networks (PSTNs) often employ a retransmission protocol to increase the reliability at which the transmitted data is received by a receiver. Retransmission protocols are especially useful in communications networks which transmit data in packet or frame format in a non-delay sensitive manner. For purposes of this disclosure, the terms "data packet" and "data frame" will each be referred to simply as a "data frame" or "frame".

One known data retransmission protocol is referred to as an automatic request retransmission protocol (ARQ). According to ARQ, a transmitter first segments the data to be transmitted into a data frame, and attaches cyclic redundant code (CRC) bits to each frame prior to transmission. Each frame is embedded with a sequence number. Upon receiving each transmitted data frame, a receiver checks the CRC bits. If a frame fails to pass the CRC check, the receiver discards the failed frame and requests retransmission of the failed frame based on the missing sequence number.

Framing and sequence numbering may be accomplished at the layer above ARQ. In that case, the ARQ protocol still needs to record all the frames transmitted for satisfying potential retransmission request. These frames have to be retained until an acknowledgement is explicitly or implicitly given from the receiver, or until time-out as pre-defined by the protocol. However, for the purposes of this disclosure, the distinction between ARQ and the layers about ARQ is not significant, and therefore they will be referred to simply as an ARQ layer. This transmission and retransmission will continue until a valid frame is received, or until the limit on the number of permitted retransmissions which has been set up based on the quality of service required for this particular communication service has been reached.

According to a technique referred to as R-RAKE, instead of discarding the frame that fails the CRC check, the receiver retains the soft input from the communication channel. The retransmission protocol then requests a retransmission of the failed data frame, and the retransmitted data frame is soft combined with the previously received data frame. The soft combined frame is then decoded. For static channel systems, such as wire-line communication systems and some types of satellite communication networks, this combining of data frames doubles the signal to noise ratio, thus providing a gain of 3 dB for the transmitted data frame.

For mobile communications systems, channels typically experience fading. However, because the retransmitted data frame is transmitted at a later time than the originally transmitted data frame, additional spreading gain is provided. Depending on the speed of the vehicle in which the mobile unit is present, as well as the overall condition of the channel, the diversity gain is typically within the range of 2–4 dB. The additional gain provided by the R-Rake technique can therefore increase the gain to about 5–7 dB in these types of systems.

In spite of the enormous gain provided by the R-Rake technique, the conventional R-Rake technique is often deemed impractical due to the following reasons. First, because the R-Rake technique can be utilized most efficiently only if the retransmitted frame is soft combined with the previously received data frame, the conventional technique typically requires the use of a large amount of memory to buffer the failed data frames.

Secondly, the transmitters in most communications systems typically will not stop transmitting data frames to wait for a retransmission request from the receiver. Rather, the transmitter will keep transmitting new data frames to the receiver, and any retransmitted data frame is therefore mixed into the stream of newly transmitted data frames. Accordingly, the receiver must be capable of identifying the retransmitted data frames that should be combined with the failed data frames stored in the buffer. This process is referred to as "frame identification".

The conventional R-Rake technique uses a message to identify the retransmitted frame. Prior to retransmitting a frame, the transmitter transmits this message to schedule a retransmitted slot at the receiver. As can be appreciated, this messaging technique requires a large amount of signaling overhead, and overall performance will suffer if any such message is lost. Furthermore, soft combining must be done at the physical layer.

On the other hand, the message may be processed in a higher layer of the protocol. However, this may incur further delay and extra network traffic. For instance, in a cellular network, physical layer processing is typically done at the Base-station Transceiver Subsystem (BTS) and higher layers are typically processed at the Base Station Controller (BSC). Hence, in order to process a message in a higher layer in a cellular network, the message would have to be sent from the BSC to the BTS, which incurs additional delay and network traffic. Due to these signaling drawbacks, the conventional R-Rake technique is deemed impractical.

Accordingly, a need exists for a system capable of effectively and efficiently retransmitting data frames to a receiver for combination with corresponding failed data frames at the receiver to increase gain at the receiver. Also, a need exists for a system capable of effectively using an R-Rake technique for retransmitting data frames without incurring the above drawbacks associated with the conventional R-Rake technique.

SUMMARY OF THE INVENTION

An object of the present invention is to provide a system and method for effectively and efficiently retransmitting data frames, which were inadequately received by a receiver, back to the receiver for combination with the inadequately received data frames to increase gain at the receiver.

Another object of the present invention is to provide a system and method for effectively and efficiently using an R-Rake technique for retransmitting data frames without incurring the signaling drawbacks associated with the conventional R-Rake technique.

A further object of the present invention is to provide a system and method for transmitting data in data frame format using an R-Rake retransmission technique while eliminating the need to transmit a signaling message to a receiver for identifying the data frames to be combined as in the conventional R-Rake technique.

These and other objects are substantially achieved by providing a system and method for transmitting data in a communications system comprising a data transmitter and a controller. The data transmitter transmits data in data frame format to be received by a receiver. Upon receiving a retransmission request from the receiver, the controller controls the data transmitter to retransmit a particular data frame to the receiver without transmitting a signaling message. The receiver receives the retransmitted data frame and compares it to other data frames stored in a buffer to determine the likelihood of a match between the transmitted data frame and a buffered data frame. When the likelihood of a match exceeds at least one predetermined threshold, the receiver combines the retransmitted data frame with the matching data frame, and performs FEC decoding on the combined frame. However, if the likelihood of a match is below any of the predetermined thresholds or the combined frame fails CRC check again, the receiver stores either the combined data frame, or the retransmitted and matching data frame in the buffer, depending on which threshold the probability of a match is below, and sends another retransmission request to the transmitter to again retransmit the data frame.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
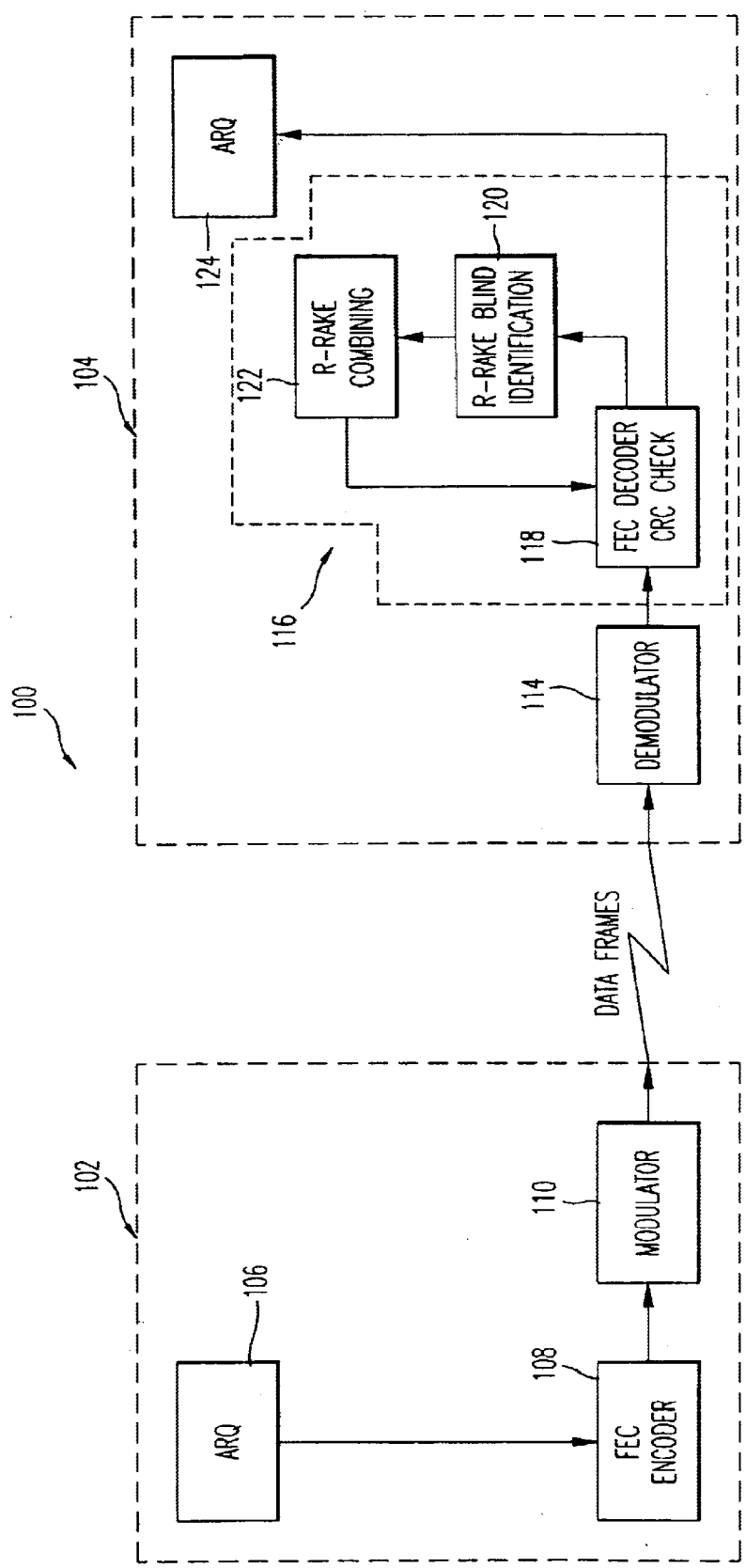
FIG. 1 is a conceptual block diagram illustrating a communications systems including a transmitter and receiver employing a system and method according to an embodiment of the present invention for performing an effective data frame retransmission technique.

FIG. 1 is a conceptual block diagram of a communications system 100, such as a wireless terrestrial or satellite-based communications system, or a wire-line communications system, employing a frame retransmission technique according to an embodiment of the present invention. The system 100 includes at least one transmitter 102 which transmits data in data frame format, and at least one receiver 104 which receives the transmitted data frames. As can be appreciated by one skilled in the art, the system 100 can includes any number of transmitters 102 and receivers 104.

As illustrated, the transmitter includes an ARQ layer 106 which provides data in data frame format to a forward error correction (FEC) encoder 108 that encodes the data frames as can be appreciated by one skilled in the art. The FEC encoder provides the encoded data frames to a modulator 110 that modulates the data frames and transmits the modulated data frames over a physical channel. The encoded and modulated data frames are then transmitted over the selected "noisy" transmission channel to be received, for example, by the receiver 104. As discussed above, the transmission can be wireless or wire-line transmission.

The receiver 104 then receives a corrupted version of the transmitted signal. The receiver 104 includes a demodulator 114 for demodulating the received data frames. The demodulator provides the demodulated data frames to a data frame decoding, analyzing and combining unit 116 comprising an FEC decoder and CRC check component 118, an R-Rake blind identification component 120, and an R-Rake combining component 122, as described in detail below. After passing through the data frame analyzing and combining unit 116, the data frames are then provided to an ARQ layer 124 as shown.

The frame retransmission technique according to an embodiment of the present invention employs an R-Rake technique. It is noted that according to this embodiment, the CRC bits should be included in the physical layer of the transmitted data, because the R-Rake implementation will largely occur in the physical layer.

Also, the R-Rake protocol awareness for the system 100 can be set in either of the following three ways. The R-Rake can be made as a default protocol, meaning that all transmitters 102 and receivers 104 are configured to support an R-Rake technique. In this event, R-Rake performance gain can always be obtained, and signaling overhead is minimal. However, the required buffer complexity is less flexible.

On the other hand, R-Rake can be an implementation choice, so that some transmitters 102 and some receivers 104 may not support the R-Rake technique. From a signaling point of view, this option may be advantageous since there is not any signaling overhead for transmitters 102 and receivers 104 not supporting R-Rake. However, for this configuration, since a transmitter 102 will not know whether a particular receiver 104 supports R-Rake, the transmitter 102 may not fully take advantage of the gain benefits associated with R-Rake. For instance, if a transmitter 102 is transmitting to a receiver 104 capable of supporting R-Rake, the transmitter 102 may be able to reduce its transmission power to reduce the power consumption. However, if the transmitter 102 is not aware of the R-Rake capabilities of a particular receiver 104, the transmitter 102 would not be able to reduce its transmission power.

Alternatively, the transmitters 102 can be configured to perform a handshaking operation with the receivers 104 to which they are transmitting data frames, to determine whether the receivers support R-Rake. Although this option requires a small amount of signaling overhead, it provides the better flexibility for the system 100 than the other two options. Typically, this option is preferred for mobile communication systems. What is common for all the three approaches is that a system is not required to have signaling to support the frame identification.

As stated, the above three options for the R-Rake protocol are possible for the system 100, and each has advantages and disadvantages. The preferred R-Rake protocol for the system 100 should be based on a tradeoff between system requirements versus the applications in which the system 100 is to be used.

Figure 2:
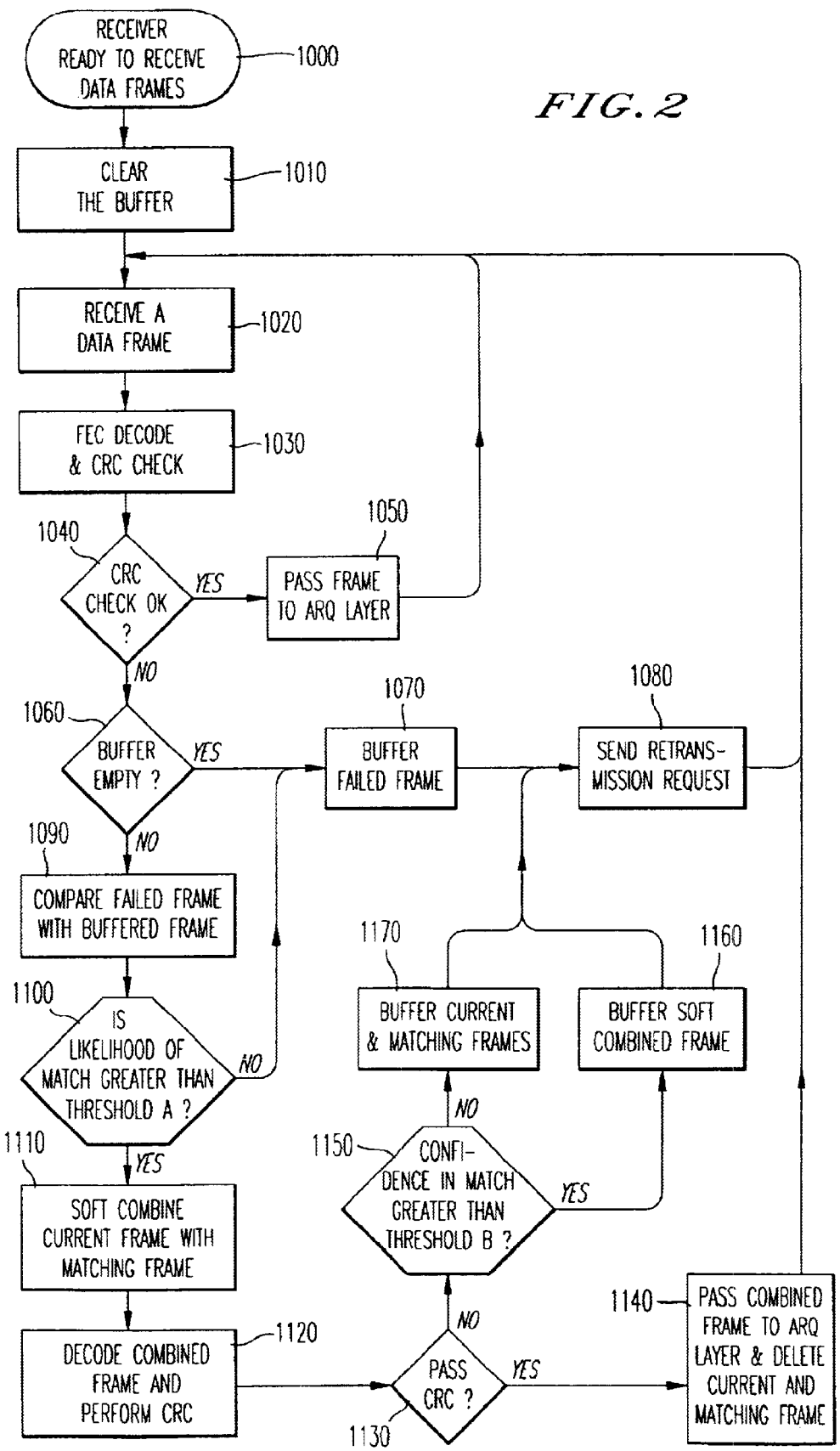
FIG. 2 is a flowchart illustrating an example of steps carried out by the system and method employed in the communications system shown in FIG. 1 to perform the effective data frame retransmission technique.

An example of operations carried out by the transmitter 102 and receiver 104 to perform the data frame retransmission technique according to the embodiment of the present invention discussed above will now be described with reference to FIG. 2. As will be appreciated by one skilled in the art, the data frame retransmission technique employs a "blind identification" technique to identify the retransmitted data frames, and thus avoids the use of a message signal as in the convention R-Rake technique discussed in the Background section above.

Once the receiver 104 is ready to receive data frames as shown in step 1000, the buffer of the receiver 104 is cleared in step 1010. As can be appreciated by one skilled in the art, the buffer can be any suitable type of data buffer. Although not shown specifically in FIG. 1, the buffer can be included in the R-Rake blind identification component 120 for exemplary purposes.

The receiver 104 then receives a data frame as indicated in step 1020. For a received frame, the physical layer CRC is checked in step 1030 by the FEC decoder and CRC check component 118. If the frame is FEC encoded, the CRC check is done after the frame has been FEC decoded.

If the FEC decoder and CRC check component 118 determines in step 1040 that the frame has passed the CRC, the processing proceeds to step 1050 where the frame is provided to the higher layer ARQ 124, and the processing returns to step 1020 where the receiver 104 awaits receipt of another frame. However, if the FEC decoder and CRC check component 118 determines that the frame has failed the CRC, the processing proceeds to step 1060 where it is determined whether the buffer for failed frames is empty.

If it is determined in step 1060 that the buffer is empty, the soft representation of the frame before the FEC decoding is buffered in step 1070. Optionally, the decoded frame can be buffered also, because the decoded frame is typically binary data, which requires much less memory than the soft representation of the received frame. Therefore, buffering the decoded frame does not significantly increase the memory requirement. In step 1080, a retransmission request is then sent to the transmitter 102 for the failed frame. This retransmission request is typically sent from a higher layer protocol (e.g., ARQ) of the receiver 104. The processing then returns to step 1020 where the receiver awaits receipt of another frame.

Alternatively, if it is determined in step 1060 that buffer for failed frames is not empty, the processing proceeds to step 1090 where the current failed frame will be compared with the buffered frames. This comparison is based on some of the following parameters as can be appreciated by one skilled in the art: Hamming distance of the decoded frames, Hamming distance before FEC decoding, Euclidean distance before decoding, and, in general, based on the likelihood measurement. The purpose of this step is to find the frame in the buffer that most likely matches the current failed frame.

If it is determined in step 1100 that the likelihood of a match is not larger than a threshold A, a match is not declared and the processing proceeds to step 1070 where the current failed frame is buffered. The processing then continues to step 1080 where a retransmission request is sent, and the processing returns to step 1020 where the receiver 104 awaits receipt of another frame.

However, if it is determined in step 1100 that the likelihood of a match is larger than threshold A, a match is declared. In this event, the identified matching frame in the buffer is soft combined with the current failed frame in step 1110. The combined frame is decoded once more and a CRC check is performed in step 1120. If it is determined in step 1130 that the decoded result for the combined frame passes the CRC, the processing proceeds to step 1140 where the decoded result is delivered to the higher ARQ layer and both the current frame and the matching frame are deleted from the buffer. The processing then returns to step 1020 where the receiver 104 awaits receipt of another frame.

If the decoded result for the combined frame fails the CRC in step 1130, the confidence of the match is compared to another threshold B in step 1150. If the confidence of the match is higher than a predetermined threshold B, only the soft combined frame will be buffered in step 1160, while the current failed frame will not be buffered and the frame in the buffer allegedly matching the current failed frame will also be eliminated from the buffer. The processing proceeds to step 1080 where a higher layer protocol of the receiver 104 sends a retransmission request to the transmitter for the failed frame. The processing then returns to step 1020 where the receiver 104 awaits receipt of another frame.

On the other hand, if the confidence of the match is determined in step 1150 to be below the predetermined threshold B, both the current failed frame and the allegedly matching frame are buffered in step 1170, while the soft combined frame is disregarded. The processing proceeds to step 1080 where a higher layer protocol of the receiver 104 sends a retransmission request to the transmitter for the failed frame. The processing then returns to step 1020 where the receiver 104 awaits receipt of another frame.

As can be appreciated by one skilled in the art, if it is known that retransmission takes at least T seconds, the identification procedure in step 1090 should only attempt to match the received failed frame with frames already in the buffer for a period up to T seconds. This can reduce computational complexity as well as the chances of miscombining for a consecutive error.

It is also noted that according to the process described above, for each incoming frame, blind frame identification is done only after the frame fails the CRC check. Alternatively, the process can first try to find the frame in the buffer that matches the incoming frame with high confidence and combine that matching frame with the current frame. Then, only if the combined frame fails the CRC check after FEC decoding is the current frame decoded again.

Additionally, the following buffer management strategy can be applied to managing the buffer for failed frames. If the high layer has no outstanding frame waiting for retransmission, the buffer should be emptied. Also, the system should be aware that a non-empty buffer may occur if a frame fails the physical layer CRC first time but passes the CRC check for the retransmitted frame before R-RAKE combining.

In case of buffer overflow, the simplest approach is to discard the "oldest" frame in the buffer. If the probability of buffer overflow before the retransmitted frame arrives is high, the frames with a high estimated signal to noise ratio should be retained if buffer overflow does indeed occur.

It is also noted that R-Rake may not always require a large buffer. For instance, if a base station ASIC in a mobile communications network is designed to support high speed data (e.g. 384 kbits/s), the ASIC is typically designed to support the highest data rate. However, most of the mobile stations may be operated in much lower rates, for example, at only 38.4 kbits/s for a particular connection. In this case, there will inherently be excessive buffer in the base station to support R-Rake.

Similarly, a mobile station may be designed to support a high rate data, such as 384 kbits/s. However, at times the mobile may be in a disadvantage location in which the mobile power is not sufficient to achieve that high rate, or network does not allow the mobile to transmit at that high rate due to a network limitation or fairness among different users. In these situation, extra memory is available to implement R-Rake without additional memory requirements Alternatively, the failed frame can be buffered at a different level of quantization to tradeoff complexity and performance gain. As is well known, the higher level of quantization gives better performance. Hence, if a frame fails CRC, part of the soft quantization can be buffered to reduce buffer complexity.

It should also be noted that in certain protocol, the retransmitted frame may not be identical to the original frame. For instance, the retransmitted frame could be set to have one different bit to indicate that the frame is retransmitted frame. However, as long as the difference is predetermined, R-Rake technique can be used with the following modification.

For example, assuming that "x" is the original transmitted data frame (before FEC encoding), and the retransmitted data frame is x+c, where "c" is a predetermined pattern and '+' represents the exclusive OR between the retransmitted data frame and he predetermined pattern. Assuming that "X" and "C" represent the FEC encoded data of "x" and "c", respectively, the retransmitted frame is thus equal to X+C as long as the FEC code is linear. In this event, the difference between the original transmitted data frame and the retransmitted frame can be compensated for before combining the two frames at the receiver 104 by multiplying "−1" to the position of the received frame at the positions that the data C is equal to one.

As can be appreciated from the above, the present invention can be employed in any frame data communications system using retransmission protocol such as ARQ (automatic request transmission) or R-Rake. The technique according to the embodiment of the present invention as described above, when used with R-Rake, can provide a 3 dB gain in a static channel communications system, such as a wire-line and satellite communication system, and between 5–7 dB gain for a mobile communication system due to the additional diversity gain of these types of systems.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for transmitting data frames in a communications system comprising a transmitter and a receiver, comprising:

transmitting a data frame from said transmitter to said receiver;

when said transmitter receives a request from the receiver for retransmission of said data frame, retransmitting said data frame to the receiver without transmitting a signaling message identifying said retransmitted data frame;

receiving said retransmitted data frame at said receiver;

comparing said received retransmitted data frame to other data frames stored in a buffer to locate a potentially matching data frame which potentially matches said received retransmitted data frame and to determine a probability of a match between said received retransmitted data frame and said potentially matching data frame;

when a probability of a match between said received retransmitted data frame and one of said data frames in said buffer exceeds at least a first threshold, said receiver soft combines said received retransmitted data frame with the potentially matching said one data frame to form a soft combined data frame;

when said probability is below the first threshold, storing said received retransmitted data frame in said buffer;

verifying a criteria of said soft combined data frame; and when said criteria of said soft combined data frame is unacceptable, comparing said probability to a second threshold.

2. A method as claimed in claim 1, wherein:

when said probability is below said first threshold, sending another retransmission request to said transmitter to request said transmitter to again retransmit said data frame.

3. A method as claimed in claim 1, further comprising:

when said criteria of said soft combined data frame is acceptable, deleting said potentially matching data frame from said buffer.

4. A method as claimed in claim 1, further comprising:

when said probability is above said second threshold, storing said soft combined data frame in said buffer; and when said probability is below said second threshold, storing said received retransmitted data frame and said potentially matching data frame in said buffer.

5. A method as claimed in claim 1, wherein:

said comparing compares a Hamming distance between said received retransmitted data frame and said other data frames stored in said buffer to locate said matching data frame.

6. A method as claimed in claim 1, wherein said soft combined data frame is encoded, and the method further comprises:

decoding said soft combined data frame to produce a decoded soft combined data frame;

verifying a criteria of said decoded soft combined data frame; and when said criteria of said decoded soft combined data frame is acceptable, deleting said potentially matching data frame from said buffer.

7. A method as claimed in claim 1, further comprising:

before performing said comparing and soft combining, determining whether said retransmitted frame includes a retransmission indicator; and when said determining step determines that said retransmitted frame includes said retransmission indicator, modifying said retransmitted frame to eliminate said retransmission indicator before performing said comparing and soft combining.

8. A method as claimed in claim 1, further comprising:

before performing said comparing, determining whether said retransmitted frame includes a retransmission indicator; and when said determining determines that said retransmitted frame includes said retransmission indicator, modifying said retransmitted frame to eliminate said retransmission indicator before performing said comparing.

9. A method as claimed in claim 1, wherein:

said retransmitting retransmits said data frame at a power no greater than a power at which said data frame was transmitted during said transmitting.

10. A method as claimed in claim 1, wherein:

said comparing is performed for a predetermined time upon receipt of said retransmitted data frame by said receiver.

11. A method as claimed in claim 1, further comprising:

when said receiver determines that retransmission of said data frame is necessary, buffering said data frame.

12. A method as claimed in claim 11, wherein:

said buffering buffers said data frame at a level of quantization based on a desired level of performance of said receiver.

13. A computer readable medium having stored instructions for controlling a receiver of a communications system, comprising:

a first set of instructions, adapted to control said receiver to analyze a criteria of a received data frame and to transmit a request to a transmitter for retransmission of said data frame when said criteria is unacceptable;

a second set of instructions, adapted to control said receiver to compare said received retransmitted data frame to other data frames stored in a buffer to locate a potentially matching data frame and to determine a probability of a match between said received retransmitted data frame and said potentially matching data frame;

a third set of instructions, adapted to control said receiver to soft combine said received retransmitted data frame with said potentially matching data frame when said probability exceeds at least one first predetermined threshold;

verifying a criteria of said soft combined data frame; and when said criteria of said soft combined data frame is unacceptable, comparing said probability to a second threshold.

14. A computer readable medium as claimed in claim 13, further comprising:

a fourth set of instructions, adapted to control said receiver to perform the following when said probability is below any of said at least one first predetermined threshold:

store in said buffer either said soft combined data frame, or said received retransmitted and said matching data frame in the buffer, depending on which of said at least one first threshold said probability is below; and send another retransmission request to said transmitter to request said transmitter to again retransmit said data frame.

15. A computer readable medium of as claimed in claim 13, further comprising a fifth set of instructions which is adapted to control said receiver to perform the following operations before said second and third set of instructions control said receiver to perform said comparing and combining soft operations:

determine whether said retransmitted frame includes a retransmission indicator; and when said retransmitted frame includes said retransmission indicator, modify said retransmitted frame to eliminate said retransmission indicator.

16. A computer readable medium as claimed in claim 13, further comprising:

a fourth set of instructions, adapted to control said transmitter to retransmit said data frame at a power no greater than a power at which said data frame was transmitted during said transmitting.

17. A computer readable medium as claimed in claim 13, wherein:

said comparing is performed for a predetermined time upon receipt of said retransmitted data frame by said receiver.

18. A computer readable medium as claimed in claim 13, further comprising:

a fourth set of instructions, adapted to control said receiver to buffer said data frame when said receiver determines that retransmission of said data frame is necessary.

19. A computer readable medium as claimed in claim 18, wherein:

said buffering buffers said data frame at a level of quantization based on a desired level of performance of said receiver.

20. A communications system, comprising:

a transmitter, adapted to transmit a data frame;

a receiver, adapted to receive said data frame and to send a request for retransmission of said data frame based on a criteria of said received data frame;

said transmitter being further adapted to retransmit said data frame to said receiver without transmitting a signaling message identifying said retransmitted data frame in response to said request;

said receiver being adapted to receive said retransmitted data frame, and to compare said received retransmitted data frame to other data frames stored in a buffer;

when a probability of a match between said received retransmitted data frame and one of said data frames in said buffer exceeds at least one first predetermined threshold, said receiver soft combines said received retransmitted data frame with the matching said one data frame;

verifying a criteria of said soft combined data frame; and when said criteria of said soft combined data frame is unacceptable, comparing said probability to a second threshold.

21. A communications system as claimed in claim 20, wherein said receiver is further adapted to perform the following operations when said probability is below any of said at least one first predetermined threshold:

storing in said buffer either said soft combined data frame, or said received retransmitted and said matching data frame in the buffer, depending on which of said at least one first threshold said probability is below; and sending another retransmission request to said transmitter to request said transmitter to again retransmit said data frame.

22. A communications system as claimed in claim 20, wherein said receiver is further adapted to perform the following operations before performing said comparing and soft combining operations:

determining whether said retransmitted frame includes a retransmission indicator; and when said retransmitted frame includes said retransmission indicator, modifying said retransmitted frame to eliminate said retransmission indicator.

23. A system as claimed in claim 20, wherein:

said transmitter retransmits said data frame at a power no greater than a power at which said data frame was transmitted during said transmitting.

24. A system as claimed in claim 20, wherein:

said comparing is performed for a predetermined time upon receipt of said retransmitted data frame by said receiver.

25. A system as claimed in claim 20, wherein:

said receiver buffers said data frame when said receiver determines that retransmission of said data frame is necessary.

26. A system as claimed in claim 25, wherein:

said receiver buffers said data frame at a level of quantization based on a desired level of performance of said receiver.

* * * * *